United States Patent
Yamagata

(10) Patent No.: US 6,263,106 B1
(45) Date of Patent: *Jul. 17, 2001

(54) IMAGE DATA COMPRESSION DEVICE HAVING COMPRESSION INHIBITING FUNCTION

(75) Inventor: Naoki Yamagata, Tokyo (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/673,562

(22) Filed: Jul. 1, 1996

(30) Foreign Application Priority Data

Jul. 4, 1995 (JP) .................................................. 7-189715

(51) Int. Cl.[7] ...................................................... G06K 9/36
(52) U.S. Cl. ........................................... 382/232; 382/239
(58) Field of Search ...................................... 382/173, 113, 382/100, 137, 138, 232, 233, 235, 239, 282, 286, 305, 306, 307, 308, 309, 310, 311, 312, 317, 318, 321, 234, 236, 237, 238, 240, 241, 242, 243, 244, 245, 246, 247, 248, 249, 250, 251, 252, 253, 284, 166; 358/403, 426, 428, 450, 453, 464

(56) References Cited

U.S. PATENT DOCUMENTS

| | | | |
|---|---|---|---|
| 5,040,233 | * 8/1991 | Davy et al. | 382/239 |
| 5,060,286 | * 10/1991 | Miller | 382/239 |
| 5,063,608 | * 11/1991 | Siegel | 382/239 |
| 5,107,345 | * 4/1992 | Lee | 382/239 |
| 5,121,216 | * 6/1992 | Chen et al. | 382/239 |
| 5,241,395 | * 8/1993 | Chen | 382/239 |
| 5,265,180 | * 11/1993 | Golin | 382/239 |
| 5,267,333 | * 11/1993 | Aono et al. | 382/56 |
| 5,267,334 | * 11/1993 | Normille et al. | 382/239 |
| 5,321,520 | * 6/1994 | Inga et al. | 358/403 |
| 5,610,723 | * 3/1997 | Yamagishi | 386/75 |
| 5,652,857 | * 7/1997 | Shimoi et al. | 399/440 |
| 5,764,800 | 6/1998 | Yamagata | 382/232 |

* cited by examiner

Primary Examiner—Jose L. Couso
Assistant Examiner—Duy M. Dang
(74) Attorney, Agent, or Firm—Greenblum & Bernstein P.L.C.

(57) ABSTRACT

A number of image data files recorded by the image data compression device are stored in an IC in memory card either uncompressed, in a low-compression, format, or in a high-compression format. In order to free memory for further files in the IC card, selected uncompressed or low-compression format files existing in the IC memory can be recalled and compressed to the next higher level of compression, replaced the former files recorded in the card. A set of data flags in the image data compression device, corresponding to each of the existing files in the card and set at the time of recording, can be set by an operating switch to exclude (inhibit compression of) selected files from those available for further compression, so that the user may mark files to be kept at a higher image quality.

23 Claims, 12 Drawing Sheets

|  | D7 | D6 | D5 | D4 | D3 | D2 | D1 | D0 |
|---|---|---|---|---|---|---|---|---|
| 0H | 0 | 0 | 0 | 0 | 0 | 0 | 0 | 0 |
| 1H | 0 | 0 | 0 | 0 | 0 | 0 | 1 | 0 |
| 2H | 0 | 0 | 1 | 0 | 0 | 0 | 0 | 0 |
| 3H |  |  |  |  |  |  |  |  |

IMAGE DATA COMPRESSION DEVICE HAVING COMPRESSION INHIBITING FUNCTION

BACKGROUND OF THE INVENTION

The present invention relates to an image data compression device employed in an image data processing apparatus, such as a still video camera.

Still video cameras utilizing IC memory cards as recording media are well known, Since the IC memory card is capable of storing only a limited amount of data, the number of image frames stored as files in the IC memory card is also limited. In order to increase the number of frames in the IC memory card, the image data is compressed in accordance with a compressing algorithm, and then, the compressed image data is stored in the IC memory card. One such compression algorithm is the JPEG (Joint Photographic Experts Group) format, a "lossy" method.

When image data is compressed with a "lossy" compression method, however, the quality of an image reproduced from the compressed image data is not as good as the originally captured image, as minute image information is lost during the process of compression. If an image is compressed to a higher degree of compression, then more image information is lost.

In a still video camera enabling a user to select whether or not image data is compressed when the image data is stored in the IC memory card is suggested, if a user thinks it is not critical to maintain the quality of the image when the image data is stored, in the IC card memory, the user can store the image data compressed. On the other hand, if the user wishes to retain the highest possible quality, the image data can be stored uncompressed.

As the user continues to take and store photographs, the IC memory card becomes full of image data files. If the user, desires to take additional photographs, another IC memory card trusts be used. Alternatively, instead of replacing the IC memory card, the user deletes or compresses image data already stored in the IC memory card. In such a case, the user is more likely to convert a file previously stored in the IC memory card, since no previous images are lost by this solution.

However, once the image data is stored in the IC card memory, it is difficult to identify the image data contained in each file without reproducing the image from the image data on a screen or hardcopy. That is, since it is difficult for the user to identify which images should be high quality and which may be of lower quality without reproducing the images; it is difficult to select which files may be compressed or further compressed to free some of the IC card memory. As described above, if the image data of an image that the user wishes to retain at a higher quality, already stored in the IC memory card, is compressed or further compressed, information will lost from the desired image data, and the image later reproduced from the compressed data is deteriorated.

SUMMARY OF THE INVENTION

It is therefore an object of the invention to provide an image data compression device which enables a user of a still video camera to select image data that is inhibited from being compressed.

The present invention is directed to an image data compression device that satisfies this need. According to one aspect of the invention, an image data recording device includes means for recording a plurality of image data files in a recording medium as recorded image files, and means for storing a plurality of data flags. The plurality of data flags correspond to the plurality of recorded image data files. When an image data file is recorded in the recording medium, a status of a corresponding one of the plurality of data flags can be set to a predetermined status. The image data recording device further includes means for compressing the recorded image data files in the recording medium, and means for inhibiting the compressing means from compressing the recorded image data file if a corresponding one of the plurality of flag data has the predetermined status.

By compressing image data files already recorded in the recording medium, the remaining capacity is increased, and it becomes possible to store additional image data files.

The image data recording device may be provided with means for capturing an image and generating image data. The compressing means compresses the image data generated by the capturing means when the image data file is first recorded in the recording medium.

When the recorded image data file to be compressed by the compressing means has been compressed at a predetermined compression ratio, the compressing means compresses the recorded image data file at a second compression ratio which is higher than the predetermined compression ratio. Thus, even if a compressed image data file is stored in the recording medium, the compressed image data file is further compressed, and the remaining capacity of the recording medium (where additional data can be stored) is increased.

When the image data file to be compressed by the compressing means has been compressed at the predetermined compression ratio, the compressing means expands the compressed image data file and then compresses the expanded image data file at the second compression ratio.

The image data recording device is further provided with means for indicating a remaining capacity of the recording medium. Therefore, a user can determine whether compression of the recorded image data files is necessary in order to record further image data.

The storing means comprises a non-volatile rewritable memory, Therefore, the flags indicating whether compression is inhibited are not deleted, even if the recording device is turned OFF.

The image data recording device further comprises means for determining whether a recorded image data file to be compressed can be compressed further. The compressing means does not compress the image data file to be compressed if it is determined that the image data to be compressed can not be compressed further. For example, if the recording device can store uncompressed image data files, low-compression format image data files, and high-compression format image data files in the recording medium, the uncompressed image data files and the low-compression format image data files can be further compressed, nut the high-compression format image data files are not compressed.

The image data recording device could be a still video camera.

According to another aspect of the invention, an image data compression device, employed in an image recording device, for corresponding a plurality of recorded image data files in a recording medium, the plurality of recorded image data files corresponding to a plurality of images, the image data compression device comprising a memory for storing a plurality of flags, the plurality of flags corresponding to the plurality of recorded image data files, an operable member for setting a status of each of the flags, a data compression circuit for reading recorded image data files out of the recording medium and compressing the image data, a second operable member for selecting a recorded image data file in the recording medium and initiating a data compression by the data compression, and a controller for inhibiting the compression circuit from compressing the image data if a flag corresponding to the recorded image data file to be compressed has a predetermined status.

According to a further aspect of the invention, there is provided a file compression device for compressing a plurality of recorded image data files in a recording medium, comprising: means for storing a plurality of flags, the plurality of flags corresponding to the plurality of recorded image data files, means for setting a status of each of the flags, means for compressing a recorded image data file, means for actuating the compressing means, and means for inhibiting the compressing means from compressing a recorded image data file if the flag corresponding to the recorded image data file has a predetermined status.

BRIEF DESCRIPTION OF THE ACCOMPANYING DRAWINGS

DESCRIPTION OF THE EMBODIMENT

Figure 1:
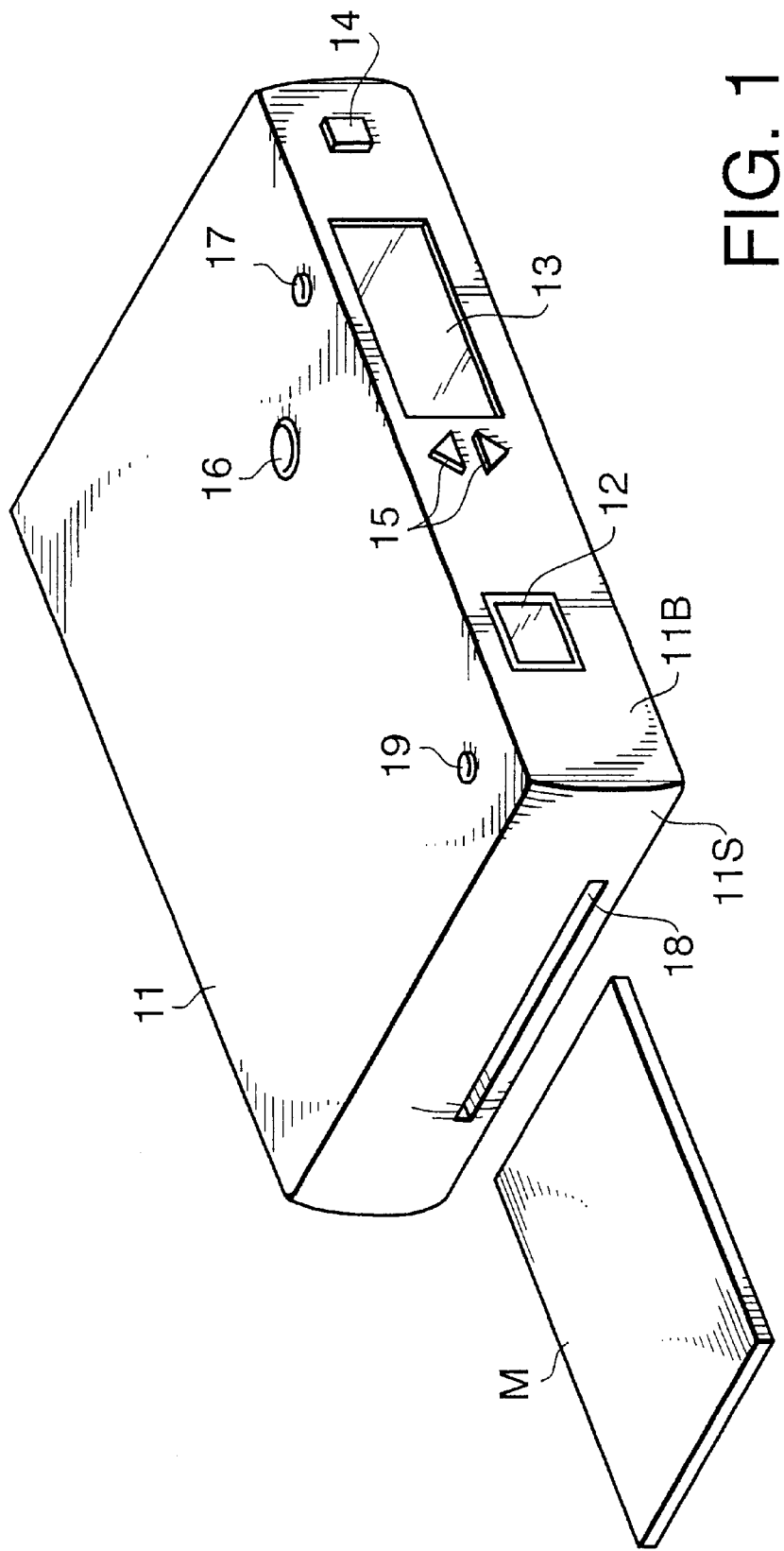
FIG. 1 is a perspective view of a still video camera embodying the present invention.

FIG. 1 is a perspective view of a still video camera 11 embodying the present invention. On one side 11B of the camera 11, a finder window 12 and display panel 13 are provided. A user sees a finder field through the finder window 12. On the display panel 13, various data and messages are displayed.

Next to the display panel 13, a mode switch button 14 is provided. By operating the mode switch button 14, the user can select one of a photographing mode, an image reproducing mode or a card data compression mode. Next to the display panel 13 on the opposite side of the mode switch button 14, a set of frame forward/backward buttons 15 are provided. The user can select a frame (i.e., a file) by operating the frame forward/backward button 15. The frame number is displayed on the display panel 13.

On the top surface of the camera 11, a release button 16, a compression ratio changing button 17, and a compression inhibiting button 19 are provided. The release button 6 is used for capturing an image when the camera 11 operates in the photographing mode, and used as an operating button when the camera operates in the reproducing mode or the card data compression mode. The release button 16 is a two-step switch; when the release button 16 is depressed halfway, a first switch (not shown)is turned ON; and when the release button 16 is depressed at its full stroke, a second switch (not shown) is turned ON. When the camera 11 operates in the photographing mode; half depression of the release button 16 (turning ON the first switch) actuates a photometry operation and range finding operation, and full depression of the release button 16 (turning ON the second switch) executes an exposure operation. The compression inhibiting button 19 is operated for inhibiting the compression of an image data stored in a recording medium, and is described in detail later.

On a side surface 11S of the camera, 11, a slot 18 is formed, in which an IC memory card is inserted. Inside the slot, a receptacle having a plurality of terminals (not shown) is provided to which a plurality of corresponding terminals (not shown) of the IC memory card M connects.

Figure 2:
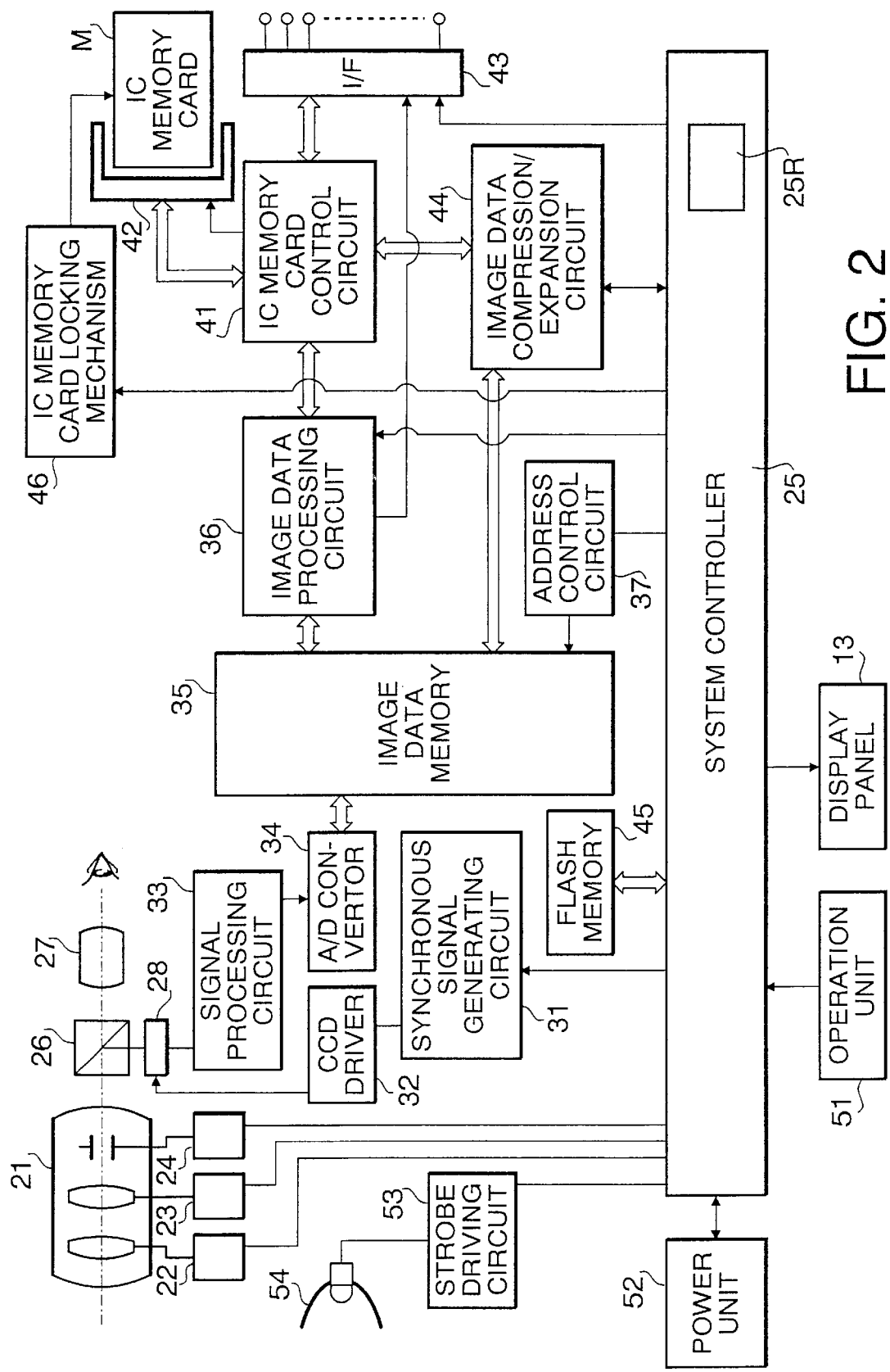
FIG. 2 is a block diagram illustrating a control system of the still video camera shows in FIG. 1.

FIG. 2 is a block diagram illustrating a control system of the still video camera 11 shown in FIG. 1. As shown in FIG. 2, the camera 11 includes a photographing optical system 21, connected to a zoom lens driving circuit 22, a focusing lens driving circuit 23 and a diaphragm driving circuit 24. The zoom lens driving circuit 22, the focusing lens driving circuit 23 and the diaphragm driving circuit 24 are controlled by a controller 25 and perform are system zooming, focusing, end aperture control, respectively of the photographing optical system. A half mirror 26, for splitting light passed through the photographing optical system 21, is provided behind the photographing optical system 21 (on the right-hand side of the photographing optical, system 21 in FIG. 2). A part of light split joy the half mirror 26 is directed to a finder optical system 27, and the remaining part of light split by the half mirror 26 is incident to the light receiving surface of a CCD (Charge Coupled Device) 28. The CCD 28 is controlled by a CCD driver 32, which is controlled in accordance with a synchronous signal output by a synchronous signal generating circuit 31. The synchronous generating circuit 31 is controlled by the system controller 25.

An image signal output by the CCD 28 is processed by a signal processing circuit 33, and is then converted to a digital image signal by means of an analog-digital (A/D) convertor 34. The digital image signal is then stored in a image data memory 35 as digital image data. A predetermined processing is applied to the image data stored in the image data memory 35 when the image data is transferred to the IC memory card M by an image data processing circuit 36. Addressing of the image data memory 35 when the image data is stored in the image data memory, and when the image data is read out of the image data memory 35, is done by an address control circuit 37, which is also controlled by the system controller 25.

The image data output from the image data processing circuit 36 is recorded in the IC memory card M via a memory card control circuit 41 and a connector 42. The image data can be converted into a video signal (such as NTSC video) and output to an external monitoring device (not shown) through an interface circuit 43.

When the image data is recorded in the IC memory card M, the image data can be selectively compressed by an image compression/expansion circuit 44. The image compression/expansion circuit 44 also expands a compressed image when the compressed image is read out of the IC memory card M.

The mode switching button 14, the frame forward/backward buttons 15, and the compression inhibiting button 19 of FIG. 1 are provided in an operation unit 51 (shown in FIG. 2) connected with the system controller 25.

The system controller 25 is also connected with the display panel 13, and a power source 52. A strobe device 54 is connected through a strobe control circuit 53 to the system controller 25. Further, a flash memory 45 is connected to the system controller 25. The flash memory 45 is a non-volatile rewritable memory for controlling the inhibition of compression of the image data. Specifically, the flesh memory 45 has an inhibit-compression flag area having a plurality of bits corresponding to files containing image data stored in the IC memory card M.

Still further, the system controller 25 is connected with an IC card locking mechanism 46 which prevents removal or insertion of the IC card memory when the power switch of the camera 11 is turned OFF (i.e., wben power is not supplied from the power unit 52 to the system controller 25). Since the IC memory card M is prevented from being removed from or being inserted into the still video camera 11, the system controller 25 is prevented from erroneously identifying the IC card memory. This process is described later.

The still video camera 11 is capable of storing the image data in the IC memory card M as image data files. The image data files can he stored in an compressed format, a low-compression format, or a high-compreasion format. In the no-compression mode selected by the mode switching button 14, the image data is not compressed, and is stored in the IC memory card M as an uncompressed format image data file. In the low-compression mode the image data originally captured is compressed at a low compression ratio, and then stored in the IC memory card M as a low-compression format image data file. In the high-compression mode, the image data originally obtained is compressed at a high-compression ratio, and then stored in the IC memory card K as a high-compression format image data file.

Figure 3:
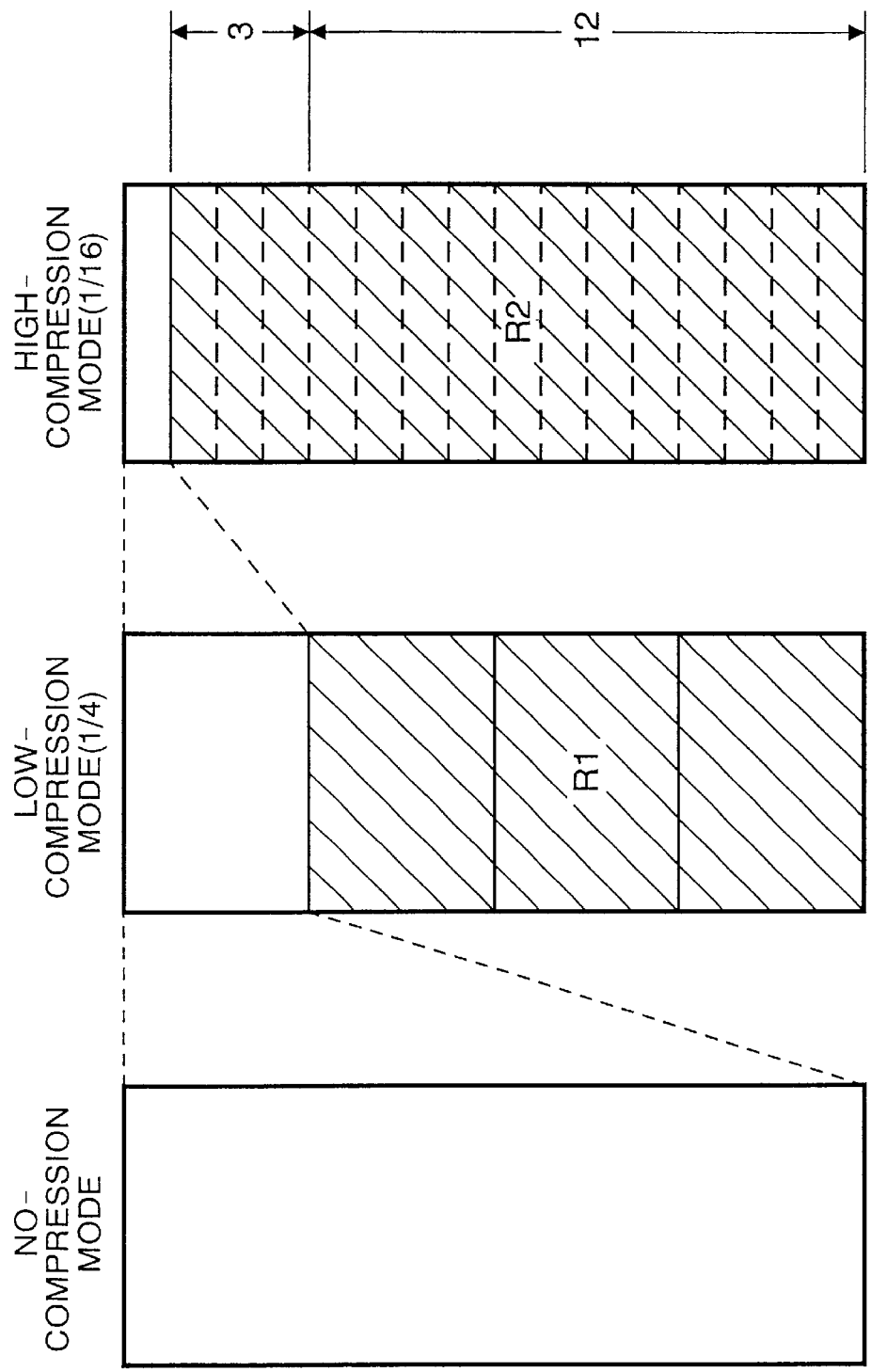
FIG. 3 shows file sizes of recorded image in an uncompressed format, a low compression format, and a high compression format.

FIG. 3 shows the relative sizes of the uncompressed format image data file, low-compression format image data file, and high-compression format image data file. The image data file stored in the uncompressed format has the same size as the original image data file; the size of the image data file stored in the low-compression format is one-fourth of the size uncompressed format image data file; and the size of the image data file stored in the high-compression format if 1/16 of the size of the uncompressed format image data file, In the embodiment, the compression is executed in accordance with a JPEG (Joint Photographic Expert Group) compression algorithm.

If an image data file stored in a recording medium, such as an IC memory card, is compressed, the size of the image data file is decreased. As a result, the area where no data is stored (free memory) in the IC memory card M increases. In the embodiment, when an image data file stored in the IC memory card M a compressed in the card data compression mode, the image data is compressed at a ratio one step higher than the currently compressed ratio. That is, if the uncompressed format image data file is to be compressed, it is compressed into a low-compression format image data file; and if the low-compression image data file is to be compressed, it is compressed into a high-compression format image data file.

When the compression of an image data file is executed, if the image data file has been stored in the low-compression format, the low-compression format image data contained in the file is expanded by the compression/expansion circuit 44, and stored in the image data memory 35. Then, the image, as expanded, is compressed at the high-compression ratio by the compression/expansion circuit 44, and transferred to the IC memory card M. If an uncompressed format image data file is compressed, the image data file is transferred from the IC memory card M to the image data memory 35, and is then compressed at the low-compression ratio by the compression/expansion circuit 44.

By compressing the image data files stored in the IC memory card M, the remaining capacity (free memory) of the IC card memory M is increased. If an uncompressed image data file, as shown in the left portion of FIG. 3 is compressed (i.e,, compressed at the low-compression ratio), enough capacity for accommodating 12 high-compression format image data files becomes newly available (area R1 in the center portion of FIG. 3). If a low-compression format, image data file, as shown in the right portion of FIG. 3, is compressed (i.e., compressed at the high-compression ratio), enough capacity for accommodating 3 additional high-compressed image data files is freed (area R2 in the right portion of FIG. 3) As noted above, the compression of all uncompressed file generates capacity for 12 high-compression format files, and compression of a low-compression format file generates capacity for three high-compression image data files.

As described, compression of the image data, depending on the data content, reduces the quality of the image reproduced from the compressed image data. Therefore, the user may wish that some image data should remain uncompressed, i.e., at the highest possible quality. According to the embodiment, the camera is provided with means to inhibit compression of certain image data, which is described in detail with reference to FIGS. 4 through 12.

Figure 4:
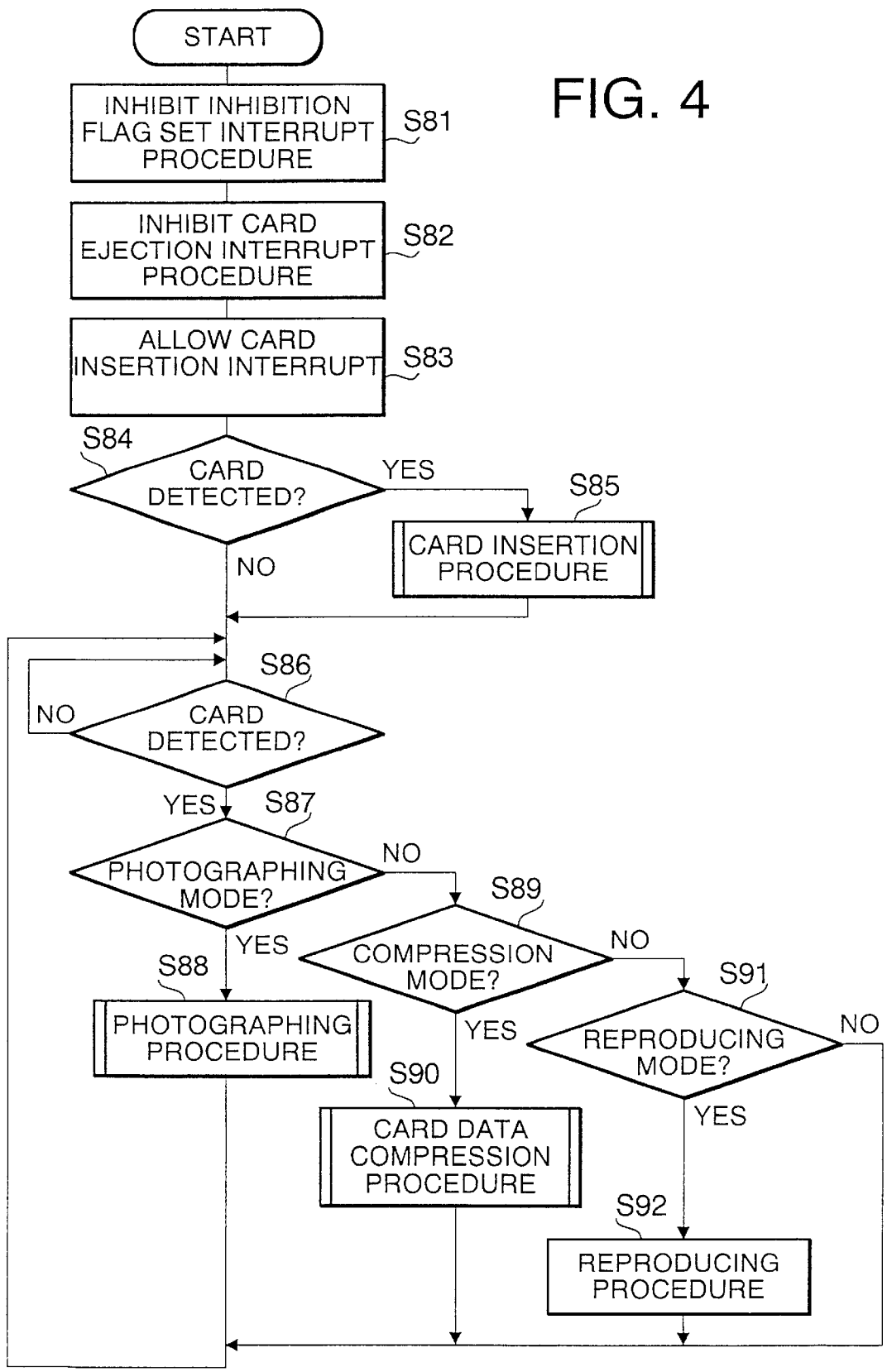
FIG. 4 is a flowchart showing a main procedure.

FIG. 4 is a flowchart showing a main procedure. The main procedure starts when the power switch of the camera 11 is turned ON (i.e., when power is supplied from the power inhibition of the unit 52 to the still video camera compression of the image data is set by executing an inhibition flag setting interrupt. As described later, the inhibition flag setting interrupt is allowed to interrupt for five seconds after the photographing (image capturing) operation is executed and before the image data is stored in the IC memory card M. Therefore, firstly the inhibition flag setting interrupt is inhibited at step S81, and is later permitted when the photographing (image capturing) operation is executed. In step S82, a card ejection interrupt is inhibited regardless of whether or not an IC memory card M is inserted in the still video camera 11. The card ejection interrupt is an interrupt procedure executed when the IC memory card M inserted in the still video camera 11 (i.e., in the slot 18) is ejected. In step S83, a card insertion interrupt is permitted. The card insertion interrupt is an interrupt procedure executed when the IC memory card M is inserted in the slot 18 of the camera 11.

In step S84, it is detected whether the IC memory card M is inserted in the slot 18 by detecting a card detection signal having a LOW status when the IC memory card M is inserted in the slot 18, and when a predetermined terminal of the receptacle inside the slot 18 is grounded. The status of the card detection signal is HIGH when the IC memory card M is inserted in the slot 18.

This card detection signal is transmitted to a predetermined port of the system controller 25. When the card detection signal input to the system controller 25 (step S84, YES) is LOW, the card insertion insertion interrupt shown in FIG. 5 is executed.

It should be noted that the card insertion interrupt is interrupt procedure which is usually executed when the IC memory card M is inserted, i.e., when the card detection signal is changed from HIGH to LOW. However, if the IC memory card has been inserted when the power switch of the still video camera 11 is turned ON, step S85 is forcibly executed.

If the IC memory card M happens to be exchanged before the power switch of the still video camera 11 is turned ON, the compression inhibition flags in the compression inhibition flag are of the flash memory 45 do not correspond to the currently inserted IC memory card M. In such a situation, the compression inhibition flags may indicate the wrong setting for the inserted IC memory card M. In order to avoid such a condition, the IC card locking mechanism 46 is provided to prevent the ejection/insertion of the IC memory card M.

Figure 5:
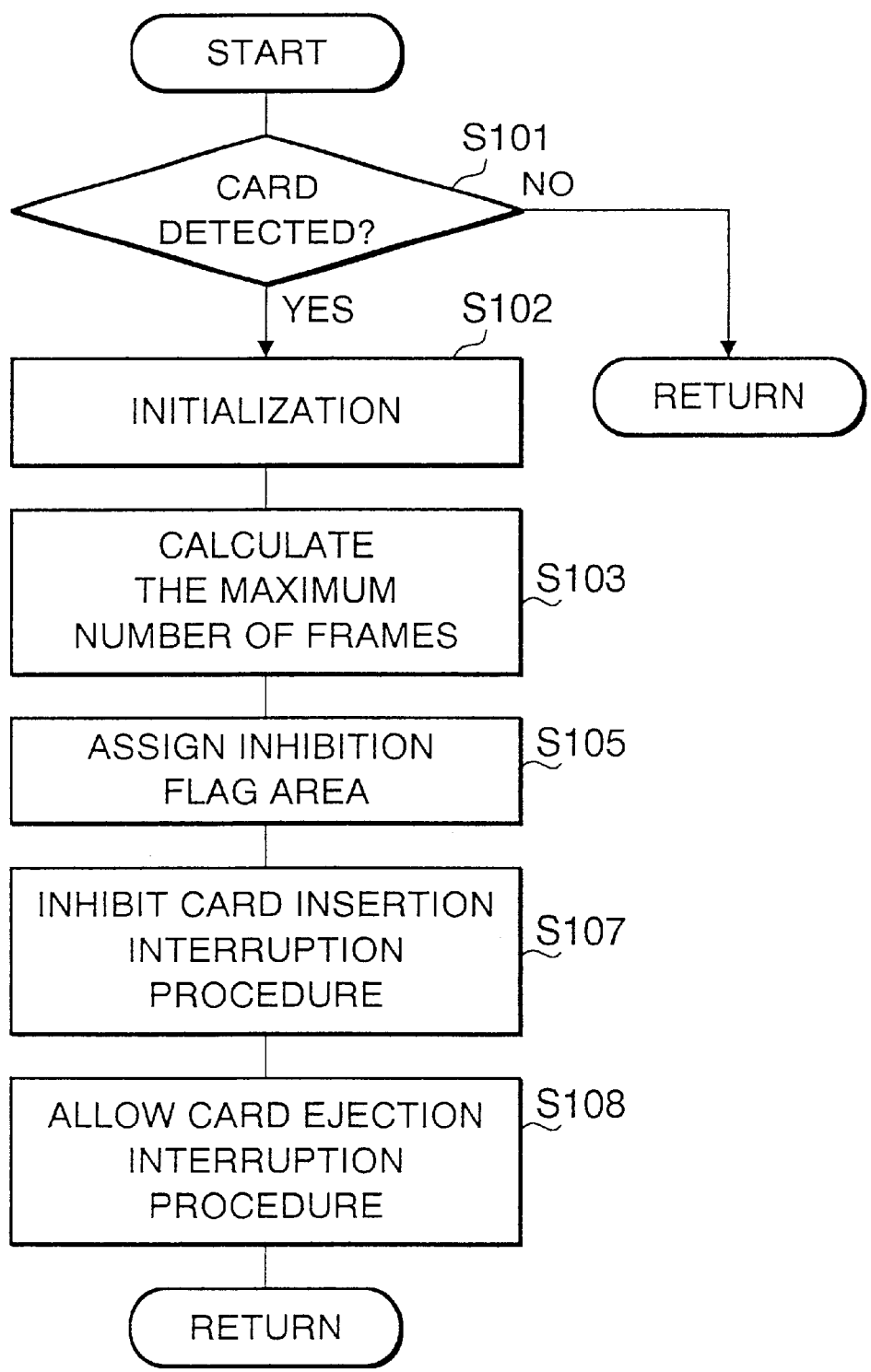
FIG. 5 shows a flowchart of a card insertion procedure.

FIG. 5 shows a flowchart of a card insertion procedure. At step S101, the process detects whether the IC memory card M inserted in the slot 18 is detected, i.e., whether card detection signal is LOW. If the IC memory card M is not inserted (S101:N0), the card detection signal is HIGH, and control terminates the card insertion procedure.

If the IC memory card M is inserted (step S101; YES), i.e., if the card detection signal is LOW, control proceeds to step S102. At step S102, an initialization procedure is performed that reads attribution data including the total capacity, type of the IC memory card M, and the like from the IC memory card M and stores the attribution data in the RAM 25R of the system controller 25.

At step S103, by dividing, the total capacity of the IC memory card M by the size of a high--compression format image data file size, the maximum number of frames (i.e., files) that the IC memory card M can store is calculated. Then, at step S105, the system controller 25 determines the addresses of a compression inhibition flag area of the flash memory 45 where the inhibit-compression flags area to be stored. The addresses are used to manage the flag settings in the flash memory 45, it should be noted-that the system controller 25 determines the addresses of the compression inhibition flag area such that the number of bits equals the number of the maximum number of files the IC memory card M can store. The addressees, as determined by the system controller, are stored in the RAM 25 of the system controller 25.

For example, if the IC memory card M has a capacity for 64 high-compression format image, data files, the compression inhibition flag area has 64 bits of data, which are identified with reference to the addresses stored in the RAM 25R. At step S107, interruption of the card insertion procedure is inhibited, and then a the card ejection procedure interrupt is permitted at step S108. After step S108, the process returns to the step whore the card insertion interrupt was started.

If the card insertion procedure is executed at step S85 of FIG. 4, i.e., when the still video camera 11 is turned ON, and the IC memory card has already been inserted, then the process determination at step S101 is YES. In this case, the attribution data is read (step S102), the maximum number of files is calculated (step S103), and addresses of the compression inhibition flag area are determined and stored in the RAM 25R. The addresses start at the same value, and end at the address corresponding to the maximum number of files the IC memory card M can store. Since the compression flags are stored in the flash memory 45, they are not deleted even if the power of the still video camera is turned OFF. Accordingly, by determining the addresses at S105, the same flags that were stored before the still video camera 11 is turned OFF are accessible.

The card insertion procedure is also started when the IC memory card is inserted in the, slot 18, when the card detection signal is changed from HIGH to LOW. All the flags are set to 0 when the IC memory card M is inserted, since, as later described, the compression inhibition flags stored in the flash memory 45 are cleared (set to 0) when the IC memory card is ejected. If the IC memory card M already contains some files, the compression inhibition flags corresponding to the stored files are 0, and therefore the user can compress the old files (without inhibition by the camera) if necessary.

At step S86 of FIG. 4, a card detection signal is detected to determine whether the IC memory card M is inserted. Step S86 is repeated until an IC memory card M is inserted in the slot 16. When the IC memory card M is inserted (step S86: YES), i.e., the card detection signal is changed from HIGH to LOW, and control proceeds to step S87.

At step S87, the process determines whether the still video camera 11 is operating in the photographing mode. If the camera 11 operates in the photographing mode (step S87: YES), a photographing procedure is executed (step S88). The photographing procedure is executed under control of the system, controller 25. It should be noted that if the IC memory card M is not inserted in the slot 18, the photographing procedure is not executed.

If the still video camera 11 does not operate in the photographing mode (step S87: NO), the process determines whether the still video camera operates in the card data compression mode at step S89. If the still video camera 11 operates in the card data compression mode (step S89: YES), a card data compression procedure is executed in S90. The card data compression procedure is also executed under the control of the systems controlled 25. If the IC memory card M is not inserted in the slot 18, the card data compression procedure is not executed.

If the still video camera 11 does riot operate in the card data compression mode (step S89; NO), the process then determines in step S91 whether the camera 11 is operating in the reproducing mode. If the camera 11 operates in the reproducing ,ode (step S91: YES), the reproducing procedure is executed step S92, wherein image data stored in the IC memory card M is read, an image is reproduced, and the reproduced image is displayed, for example, on a display device connected to the still video camera 11 through the interface 43.

If it is determined that the camera 11 does not operate in the reproducing mode (step S91: NO), or after the procedure in S88, S90 or S92 has been executed, control returns to S86, it is confirmed that the card detection signal is output (i.e., the IC memory card M is inserted in the slot 18) and then, control proceeds to S87 to execute the procedure described above.

Figure 6:
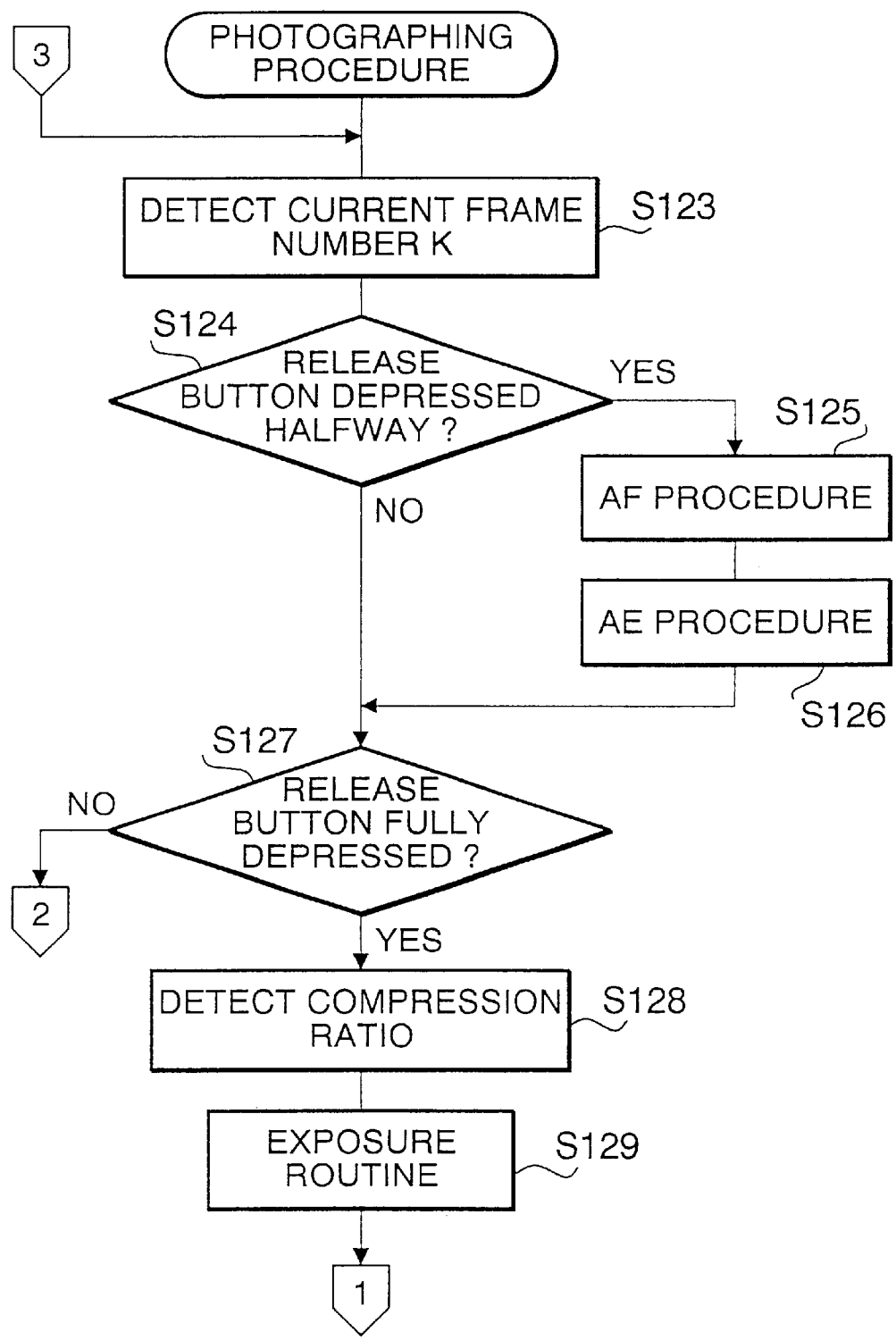
FIGS. 6 and 7 show a flowchart, illustrating a procedure when the still video camera operates in a photographing mode.
Figure 7:
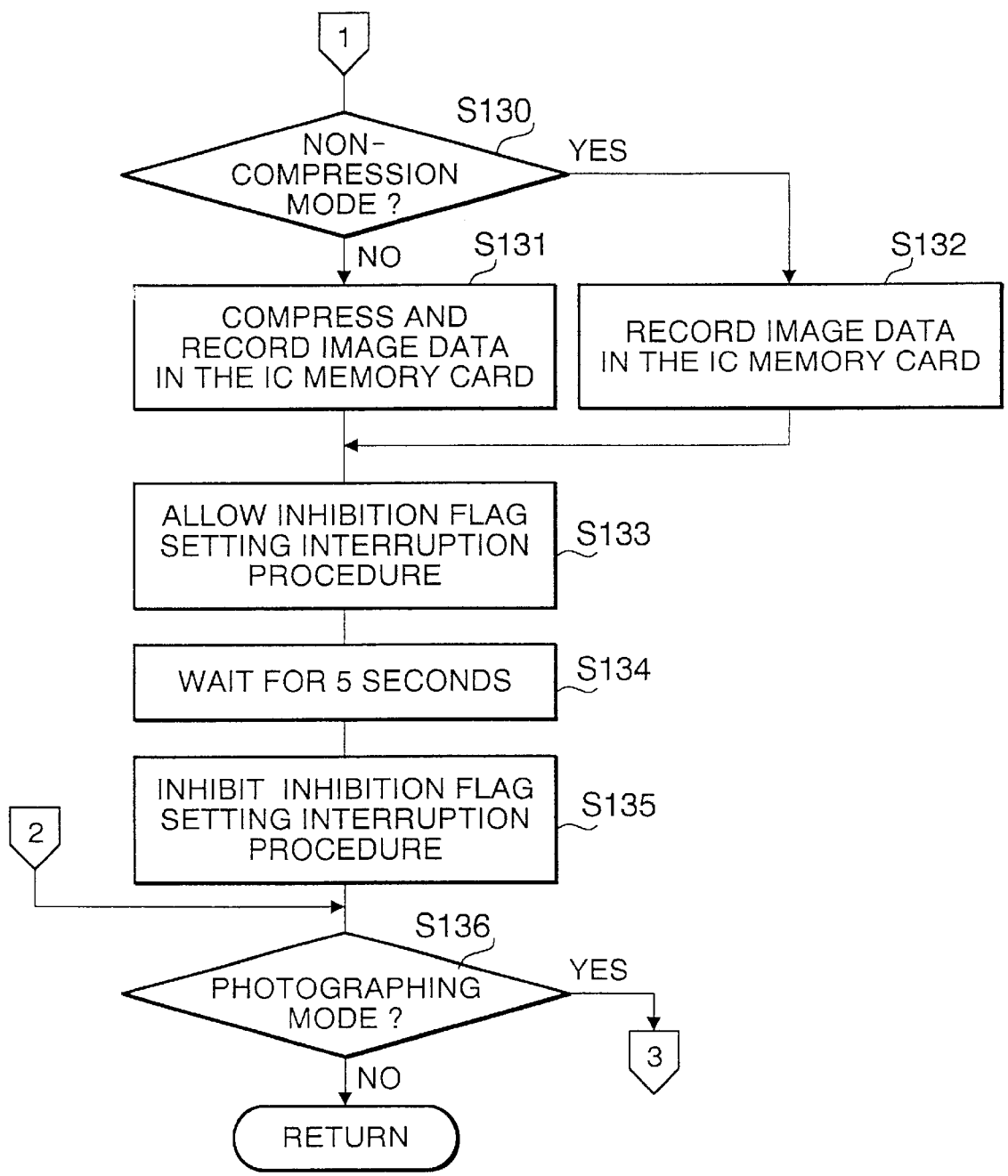

FIGS. 6 and 7 show a flowchart illustrating photographing procedure executed at step S86 of FIG. 4. In step S123, the system controller 25 refers to the frame number indicated in the header of the image data file stored in the IC memory card M to obtain a frame number K of a current frame file. The system controller 25 then detects whether the release button 16 is depressed halfway (step S124). if the release button 16 is depressed halfway (step S124: YES), an autofocusing operation is executed (step S125), and the focusing lens of the photographing optical system 21 is positioned at an in-focus position by means of the focusing lens driving circuit 23. Then, in step S126, an automatic exposure process is executed to drive the diaphragm of the photographing optical system 21 to a predetermined aperture via the diaphragm driving circuit 24.

In step S127, the system controller 25 determines whether the release button 16 is fully depressed. If the release button 16 is not fully depressed (step S127: NO), steps S128 through S135 are skipped. If the release button 16 is fully depressed (step S127: YES), control proceeds to step S128, where the compression ratio of the data to be stored in the IC memory card N is detected. The compression ratio is set by means of the compression ratio switching button 17. In the embodiment, there are three modes, corresponding to three formats, for compression of the data: an no-compression made where the data is stored in the IC memory card without compression; a low-compression mode where the data is compressed to ¼ of the uncompressed file size and is then stored in the IC memory card M; and a high-compression mode where the data is compressed to ¹⁄₁₆ of the uncompressed file size and is then stored in the IC memory card M. Then, in step S129, the exposure routine is executed, i.e., the image signal output by the CCD 28 is processed by the processing circuit 33, is converted into a digital signal by the A/D converter 34, and, is then stored in the image data memory 35.

In step S130, the system controller 25 determines whether the no-compression mode is set. If the no-compression mode is set (step S130: YES), step S132 is performed, and the uncompressed data is recorded in the IC memory card. Otherwise (i.e., when the low-compression mode or the high-compression mode is set), (step, S130: NO), the data stored in the image memory 35 is compressed by the data compression/expansion circuit 44 and stored in the IC memory card M in step S131.

In step S133, a compression inhibition interrupt procedure is permitted, and the system controller 25 waits for five seconds at step S134. At step S135, the compression inhibition interrupt procedure is again inhibited. Therefore, if the compression inhibition button 19 is depressed during the waiting period at step S134, the user can inhibit the future compression of the current photograph stored in the IC memory card M.

At step S136, the system controller 25 determines whether the photographing mode is still selected. If the photographing mode is released (i.e,, if another mode is selected, step S136: NO), the photographing procedure is terminated. If the camera operates in the photographs mode (step S136: YES), control returns to step S123 to continue the procedure described above. For example, if the camera 11 operates in the photographing mode, and the release button 16 is held depressed halfway, steps S123 through S127, and S137, are executed in order, and the A procedure and the AE procedure are repeatedly executed. If the camera 11 operates in the photographing mode and the release button 16 is not depressed, steps S123, S124, S127 and S136 are executed in order, where only detection of the current frame number K is executed.

FIG. 6 shows a flowchart of a compression inhibit flag setting interrupt procedure, if the compression inhibiting button 19 is depressed during the five second interval of step S134, the compression inhibit flag setting interrupt procedure is executed. In the compression inhibit flag setting interrupt procedure, the system controller 25 accesses the flash memory 45 (step S141), and a bit corresponding to the $K^{the}$ frame in the compression inhibit flag area of the flash memory 45 is set to 1 (step S142).

Figures 8, 9:
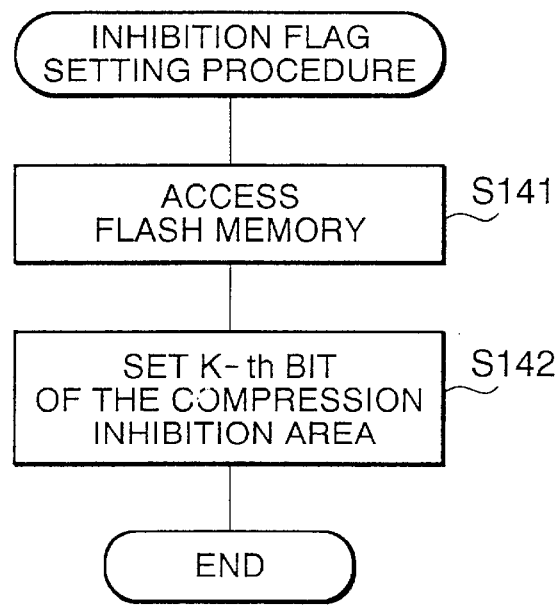
FIG. 8 shows a flowchart of a inhibit-compression flag setting procedure.
FIG. 9 shows an example of a flag setting in a compression inhibition area of a flash memory.

FIG. 9 shows an example of a flag setting in a compression inhibition area of the flash memory 45. As shown in the tabular representation of FIG. 9, bits D0 through D7 in address row 0H (hexadecimal) respectively correspond to the $1^{st}$ through $8^{the}$ frames, and bits D0 through D7 in address row 1H correspond to the $9^{the}$ through $16^{the}$ frames, respectively. Similarly, bits D0 through D7 in address row 2H correspond to the $17^{the}$ to $24^{the}$ frames, respectively, and so on. In the table shown in FIG. 9, bits corresponding to the $^{th}$ and 22nd frames are set to 1 (i.e., compression is inhibited). The remaining bits are set to 0 (zero), indicating that compression, of the corresponding image data is allowed. As previously described, the addresses are determined when the still video camera 11 is turned ON or when the IC memory card is inserted, and are stored in the RAM 25R.

Figure 10:
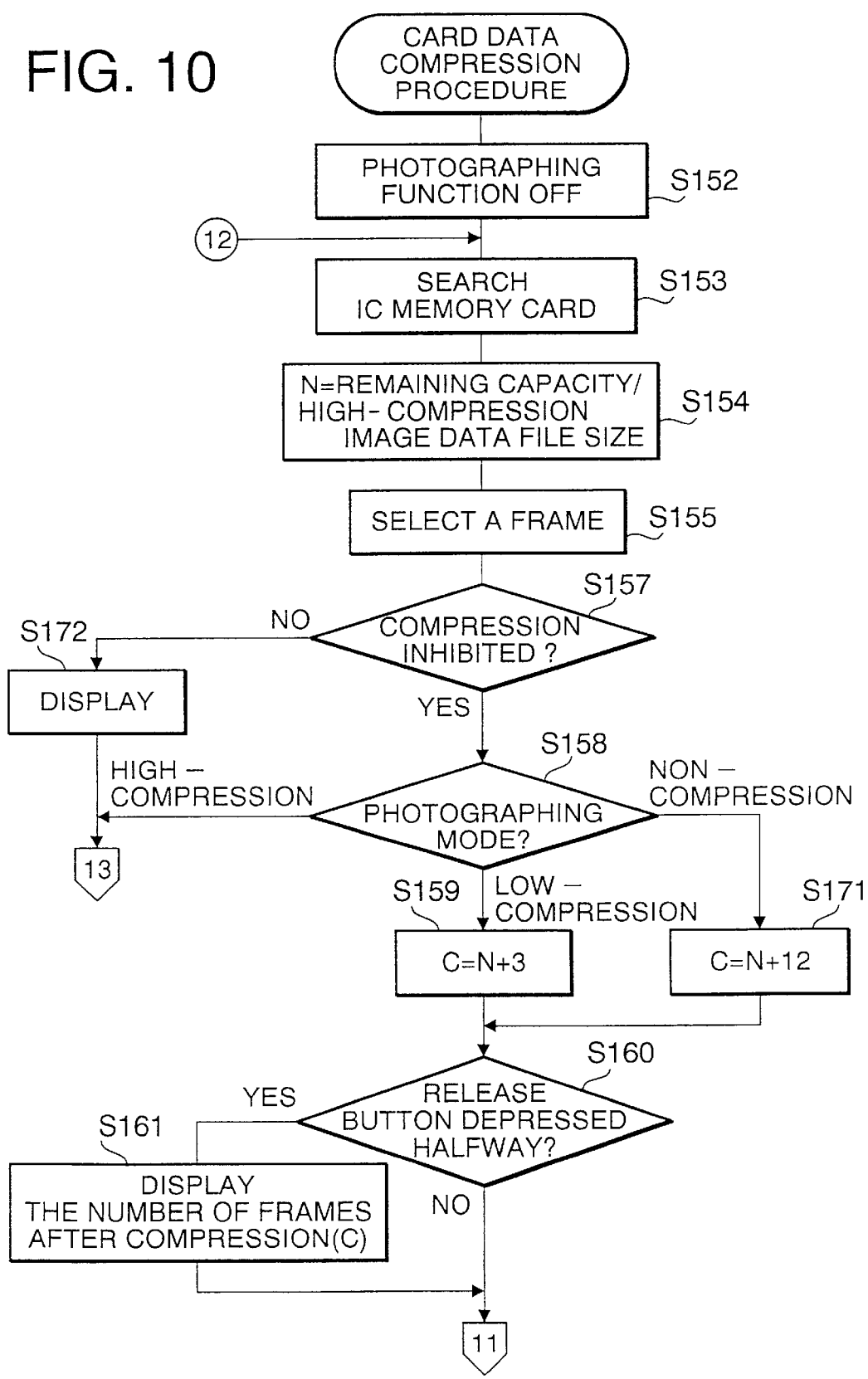
FIGS. 10 and 11 show a flowchart illustrating a procedure when the still video camera operates in a card data compression mode.
Figure 11:
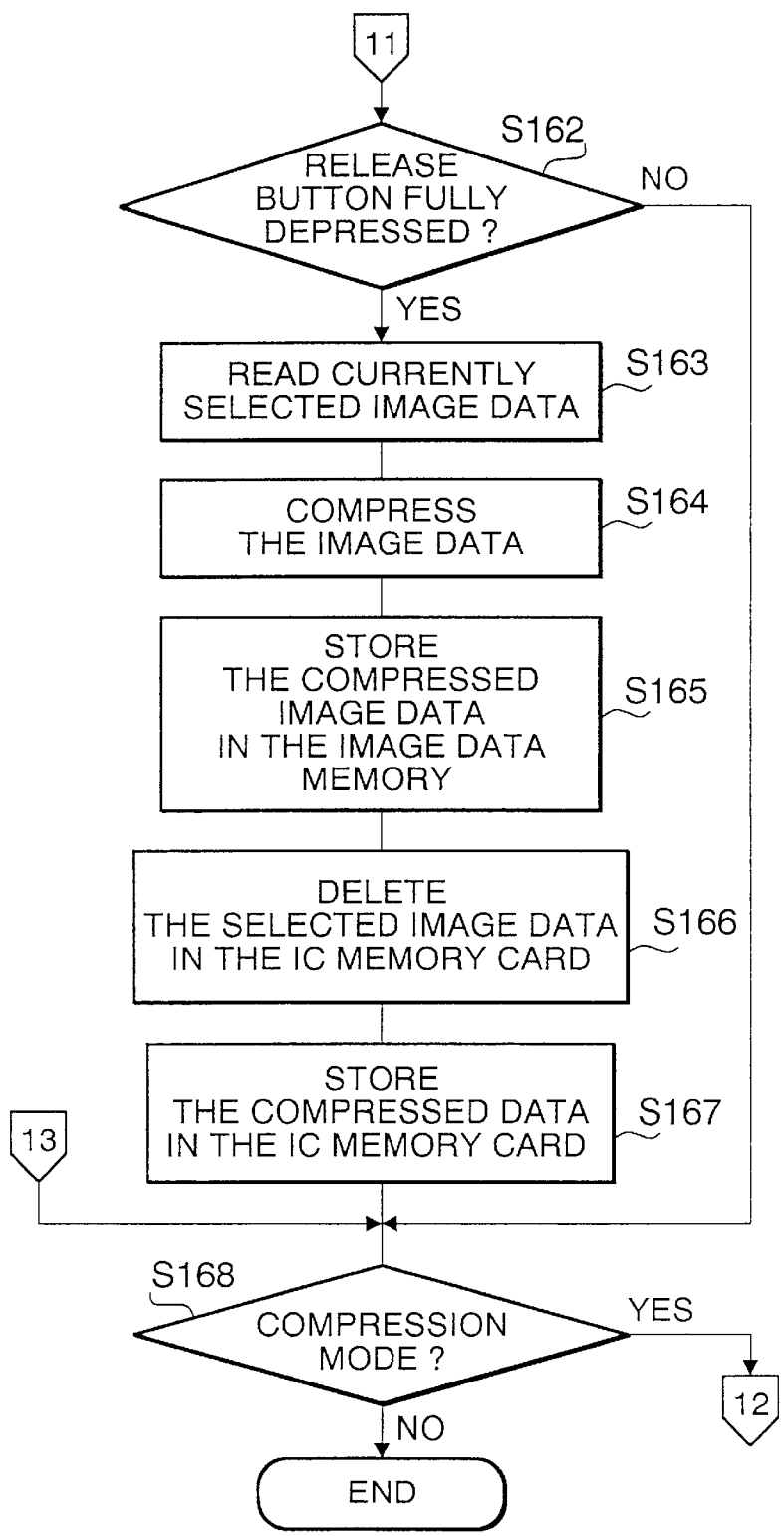
Figure 12:
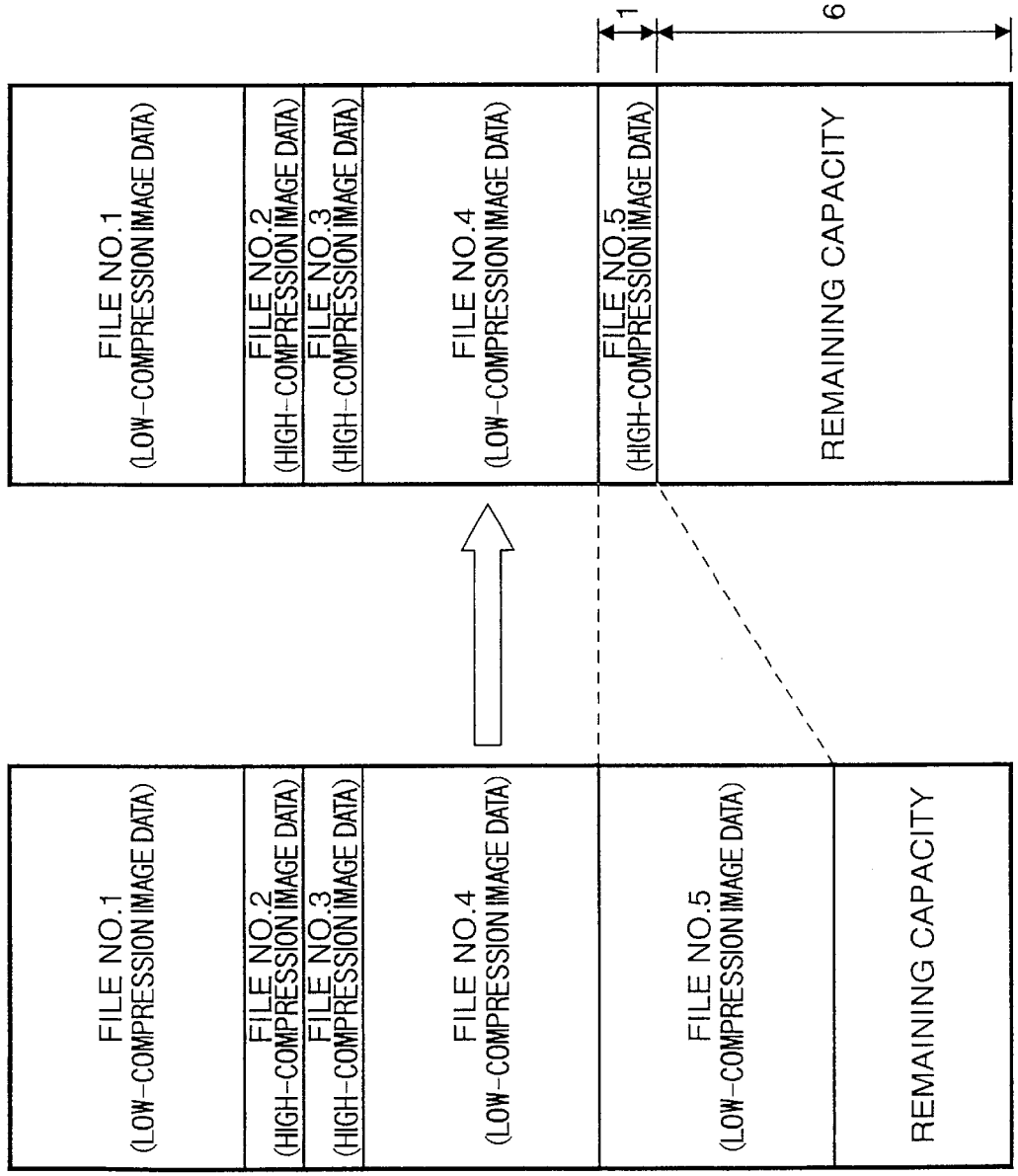
FIG. 12 shows changes in an IC memory card when the compression of the stored data is executed.

FIGS. 10 and 11 show a flowchart illustrating a procedure when the still video camera 11 operates in the card data compression mode, and FIG. 12 shows changes of the file size in the IC memory card M when the compression of stored image data is executed.

At step S152, under the control of the system controller 25, the CCD driver 34 controls the CCD 28 to stop outputting image signals (i.e., photographing function OFF). Then, in step S153, the system controller 25 detects the recording condition in the IC memory card M. The left portion of FIG. 12 shows an example of the recording condition of the IC memory card M before compression of the stored data is executed. In this example, it is assumed that file 1, file 4 and file 5 are low-compression format files, and file 2 and file 3 are high-compression format files. The empty area (remaining capacity) is, in this example, three times as large as the size of the high-compressed file.

At step S154, the size of the remaining capacity is detected, and then is divided by the size of a high-compression format image file to obtain a number N, of high-compression format image, files the empty area can accommodate. The number N is the maximum number of files which can be concurrently stored in the remaining capacity of the IC memory card M.

In step S155, a file containing the image to be compressed is selected by operating the frame forward/backward bottom 15.

In an example case, file No. 5 shown in the left portion of FIG. 12 is selected. At step S155, the system controller 25 accesses the flash memory 45, and reads the data flag corresponding to the selected file (i.e., file No. 5) from the compression inhibition flag area. Then, at step S157, whether the flag is set (i.e., equal to one) or not is examined. If, for example, the compression inhibition flags are set as shown in FIG. 9, flag No. 5 is set to 0 (zero), which means that compression of the corresponds data is permitted. Accordingly, control proceeds to step S158, and the type of compression (i,e., no-compression, low-compression or high-compression) is examined. Since file No. 5 in the left portion of FIG. 12 is a low-compression format image file, the control, proceeds to step S159 where the number N obtained at step S154 and the amount of additional file capacity freed, i.e., a number (3) of additional files when the file No. 5 is re-compressed into the high-compression image file (stop S159) is determined. In the example of the left portion of FIG. 12, existing capacity is three files, and if the file No. 5 is re-compressed, the number of files which can be stored in the IC memory card M increases to 6 (six) files as shown in the right portion of FIG. 12.

In step S160, it is determined whether the release button 16 is depressed halfway. It should be noted that, in the card data compression mode, the release button is used to initiate (i) displaying the number of files on the display 13 when the selected file is compressed and the size thereof is decreased, and (ii) executing the compressing operation. The photometry or range finding operation is not initiated by depressing the release button in the card data compression mode.

When the release button 16 is depressed halfway, the operation at step S161 is executed and the number of files the IC memory card M can store is displayed on the display 13. The number of the files when a newly stored file contains uncompressed, low-compression format, and high-compression format image data are alternately displayed in order. As illustrated in FIG. 3, if the file to be stored contains an uncompressed image file, the number of files which can be stored in the IC memory card M is, for example, equal to or greater than 16. If the file to be stored contains the low-compression image file, the number of files which can be stored in the IC memory card M is equal to or greater than 4. In the case of the right portion of FIG. 12, the number of files which can be stored in the IC memory card M is six. Accordingly, no uncompressed image file can be stored, since the integer portion of 6/16 is less than 1. If the image is stored as a low-compression format image file, the number of image files which can be stored in the IC memory is 1, since the integer portion of 6/4 is 1, If the image is stored as a high-compression format image file, the number of image files which can be stored in the IC memory is 6 (6/1). Therefore, in step S161, the numerals 0 (zero), 1 (one) and 6 (six) are sequentially displayed at a predetermined interval, e.g., 2 seconds.

If it, is determined at step S160 that the release button 16 is not halfway depressed (step S160: NO), or after the numerals are displayed in step S161, control goes to step S162 where the system controller 25 examines whether the release button 16 is fully depressed. When the release button 16 is fully depressed (step S162: YES), the procedure of steps S163 through S167 is executed, where the image data contained in the file selected at S155 is compressed.

At step S163, the selected file is read out of the IC memory card M, and stored in the image data memory. If the selected file contains compressed image data, it is expanded by the compression/expansion circuit 44. Then, the image data stored in the image data memory is compressed by means of the data compression/expansion circuit 44 (step S164). Note that the compression at S164 is done such that the originally stored image data in the IC memory card M is compressed at a higher compression ratio by one step: that is, if the originally stored image data is uncompressed image data, it is compressed into low-compression format image data; and if the originally stored image data is low-compression format image data (¼ compression with reference to the image data stored in the image data memory 35), it is compressed into high-compression format image data (1/16 compression with reference to the image data stored in the image data memory 35). With respect to file No. 5 of the left portion of FIG. 12, since the compression ratio of the image data as read out of the IC memory card M is ¼ (low-compression format image data is compressed into high-compression format image data (at the compression ratio of 1/16). The image data compressed at step S154 is stored in the image memory 35 at step S165. Steps S164 and S165 can optionally be performed concurrently, for example if the compression/expansion circuit 44 performs on-the-fly compression as the image data is written into the image data memory. At step S166, the system controller 25 deletes the file which was selected at stop S155 and remains stored in the IC memory card M, since the newly compressed image data will be stored. Then, at step S167, the newly compressed file stored in the image memory 35 is transferred to the IC memory car M to be stored therein.

It the system controller 25 determines that the release button 16 is not fully depressed (step S162. NO), then the procedure of step S163 through S167 is skipped.

At step S168, the process checks whether the still video camera 11 is in the card data compression mode. If the still video camera 11 is in the card data compression mode, control returns to stop S153 (in FIG. 10), the recording information of the IC memory card M is checked again, and control proceeds from step S153 as previously described. If the card data compression mode is released, i.e., the camera operates in another mode, the card data compression procedure is terminated.

At step S158, if the image data contained in the selected file is uncompressed image data, the number N of the files calculated at step S154 and the number of files which can be stored if the uncompressed image data is compressed are added to obtain the maximum number of files (C) which can be stored in the IC memory card, M. Thereafter, the operation after step S160, as previously described, is performed.

If the image data contained in the selected file is high-compression format image data, it is impossible to further compress the data, and control proceeds to step S168.

If the compression inhibition flag corresponding to the selected file is set to "1", at step S157 the compression ratio of the image data contained in the selected file is determined. Control then proceeds to step S172 where the inhibition of the compression of the selected image data is displayed on the displaying device 13, and control then proceeds to step S168.

Figure 13:
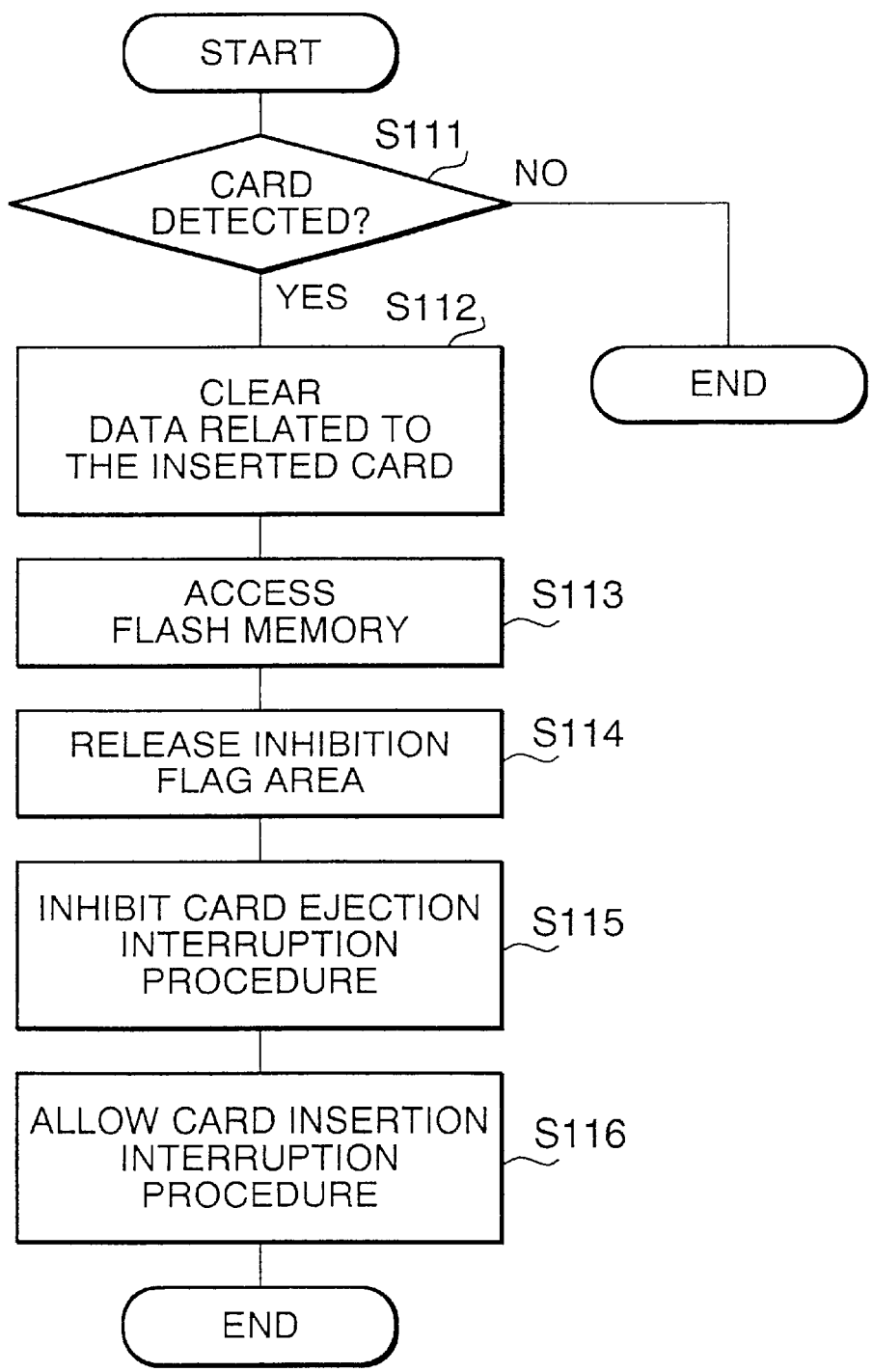
FIG. 13 shows a flowchart of a card eject procedure.

FIG. 13 shows a flowchart of a card ejection procedure. This procedure is executed when the IC memory card is ejected from the still video camera. In the procedure of FIG. 13, the compression inhibition flag area of the flash memory 45 is cleared. This procedure is similar to the procedure shown in FIG. 4, in that an interrupt procedure executed by the system controller 25 is initiated when the card detection signal is changed from ON to OFF.

At step S111, the process checks whether the IC memory card M is ejected out of the slot 18 by detecting the card detection signal. If the card detection signal is ON, the result at step S111 is NO, and the interrupt is finished. If the card detection signal is OFF (step S111: YES), the parameters representing the card type, card attribution and the like stored in the system controller 25 RAM is cleared at S112. At step S113, the system controller 25 accesses the flash memory 45, and at step S114, the compression inhibition flag area in the flash memory 45 is released, i.e., all the flags in the compression inhibition flag area, and the addresses stored in the RAM 25R, are cleared (set to 0) . At step S115, further execution of the card ejection procedure is inhibited. Then, at step S116, the card insertion interrupt procedure is permitted, and the interrupt procedure of FIG. 13 is terminated.

As described above, when the IC memory card M is ejected from the still video camera, all the flags in the compression inhibition area are cleared (set to 0). Therefore, it another card is inserted, the flags previously stored in the compression, inhibition are not be applied to the newly inserted IC memory card.

As described, according to the embodiment, the image data once stored in the IC memory, card M is compressed to free space for containing additional image data files. Thus, the IC memory card M (or the like) can be used efficiently.

Furthermore, since the number of files (image frames) which can be stored in the IC memory card M is displayed after the data stored in the IC memory card M is compressed, a user can determine the compression ratio of the image data to be stored.

Furthermore, since the user can inhibit the compression of desired image data stored in the IC memory card M, the user can inhibit the compression of the image data that the user wishes to remain sit highest quality.

The present disclosure relates to subject matter contained in Japanese Patent Application No. HEI 7-189715, filed on Jul. 4, 1995, which is expressly incorporated herein by reference in its entirety.

What is claimed is:

1. An image data compression device, employed in an image recording device, that compresses a plurality of recorded image data files in a recording medium, said plurality of recorded image data files corresponding to a plurality of images, said image data compression device comprising:

a memory that stores a plurality of flags corresponding to said plurality of recorded image data files, each of the plurality of flags indicating whether a corresponding compressible recorded image data file is allowed to be compressed, each recorded image data file of the plurality of recorded image data files comprising stored data of an entire image of each of said plurality of images;

a first operable member that sets a status of one of said plurality of flags to a predetermined status indicating that a corresponding compressible recorded image data file is prohibited to be compressed into an image data file with a lower image quality than said image data file before compression, when the first operable member is manually operated by an operator and when the corresponding recorded image data file is stored in the recording medium;

a data compression circuit that reads said recorded image data files out of said recording medium and compresses said recorded image data files into compressed image data files having lower image qualities as well as smaller sizes than said image data files before compression;

a second operable member that selects one of the plurality of recorded image data file in said recording medium and initiates a data compression that lowers an image quality of the recorded image data file than said selected image data file before compression by said data compression circuit; and a controller that reads one of the plurality of flags, which corresponds to the recorded image data file selected by the second operable member, and that determines whether the selected compressible recorded image data file is allowed to be compressed into a compressed image data file having a lower image quality than the selected recorded image data file before compression in accordance with the status of the read flag without processing the selected recorded image file, and that controls said data compression circuit to compress said recorded image data file selected by said second operable member into the compressed image data file having the lower image quality when the read flag is not set to said predetermined status, said controller replacing said recorded image data file with the compressed image data file having the lower image quality and compressed by said compression circuit if said read flag is not set to said predetermined status.

2. The image data compression device according to claim 1, wherein, if said image data is compressed by said compression circuit, said controller-deletes said recorded image data file then stores said compressed image data file in said recording medium.

3. The image data compression device according to claim 2, wherein the data compression circuit compresses the recorded image data file at one of first and second compression modes having first and second compression ratios, respectively, said second compression ratio being higher than said first compression ratio, an image quality of a compressed image data file compressed by the second compression ratio being lower than a compressed image data file compressed by the first compression ratio, and wherein said controller determines whether said recorded image data file stored in said recording medium can be further compressed by the second compression ratio, and controls said compression circuit to compress said recorded image data file by the second compression ratio only when said recorded image data file can be compressed further.

4. The image data compression device according to claim 1, wherein said controller permits said first operable member to set said status of recorded image data file when said recorded image data file is first recorded in said recording medium.

5. The image data compression device according to claim 1, wherein said recording medium is removable from said compression device.

6. The image data compression device accords to claim 5, wherein said controller clears said status of each of said plurality of flags when said recording me&urn is removed from said compression device.

7. The image data compression device according to claim 5, further comprising means for inhibiting a removal and insertion of said recording medium while said image recording device is turned OFF.

8. The data compression device according to claim 5, wherein said memory comprises a non-volatile rewritable memory.

9. The image data compression device according to claim 5, wherein said recording medium comprises an integrated circuit memory card.

10. The image data compression device according to claim 1, wherein said compression circuit compresses said image data in accordance with a compression algorithm that is in conformance with JPEG.

11. The image data compression device according to claim 1, wherein said controller prevents said compression circuit from compressing said recorded image data file when a flag corresponding to said recorded image data file has a second predetermined status, so that the recorded image data file is not compressed.

12. The image data compression device according to claim 1, wherein a whole image comprises all raster rows and byte groups of an image of each of said plurality of image data files.

13. An image data recording device, comprising:

a recorder that records a plurality of image data files to a recording medium as recorded image data files, each recorded image data file comprising stored data of an entire image of each of said plurality of image data files;

a setting unit that sets a predetermined status to one of a plurality of data flags, when the setting unit is operated an operator, each of the plurality of data flags corresponding to one of the plurality of image data files, and when each of the plurality of image data files is stored in the recording medium, the predetermined status indicating that a corresponding compressible recorded image data file is allowed to be compressed into a compressed image data file with a lower quality than said recorded image data file before the compression;

a reading unit that reads one of said plurality of recorded image data files from said recording medium;

a compressing unit that compresses said recorded image data read by said reading unit, said recorded image data file to be compressed by said compressing unit having been compressed at a first compression ratio, said compressing unit compressing said recorded image data file at a second compression ratio which is higher than said first compression ratio, into a compressed image data file having a lower image quality as well as a smaller size than the recorded image data file before compression by the second compression ratio;

a flag reading unit that reads one of the plurality of data flags corresponding to the read recorded image data file;

a determining unit that determines whether the read compressible image data file is allowed to be compressed at the second compression ratio into a compressed image data file having a lower image quality than the read image data file before compression at the second compression ratio in accordance with the status of the data flag read by the flag reading unit without processing the read image data file; and a controller that controls said compressing unit to compress said read recorded image data file at said second compression ratio into the compressed image data file having the lower image quality than said read recorded image data file before compression at the second compression ratio, only when said determining unit determines that said read data flag corresponding to said read recorded image data file is said predetermined status; and a replacing unit that replaces said read recorded image data file stored in the recording medium, only when the read data flats having said predetermined status, with the compressed image data file compressed at said second compression ratio and having the lower image quality than the read recorded image data file before compression at the second compression ratio.

14. The image data recording device according to claim 13, further comprising;

means for capturing an image and generating an image data file, said compressing means compressing said image data file generated by said capturing means when said recorded image data file is first recorded to said recording medium.

15. The image data recording device according to claim 14, said compressing means further comprising means for expanding compressed data, wherein, when said recorded image data file to be compressed by said compressing means has been compressed at said predetermined compression ratio, said compressing means expands said recorded image data file and then compresses said expanded image data file at said second compression ratio.

16. The image data recording device according to claim 14, further comprising:

means for determining whether said recorded image data file to be compressed can be compressed further, and for prohibiting said compressing means from compressing said recorded image data file to be compressed if it is determined that said recorded image data file to be compressed can not be compressed further.

17. The image data recording device according to claim 13, further comprising:

means for indicating a remaining capacity of said recording medium.

18. The image data recording device according to claim 13, wherein said storing means comprises a nonvolatile. rewritable memory.

19. The image data recoiling device according to claim 13, wherein said image data recording device comprises a still video camera.

20. The image data recording device according to claim 13, wherein said controller prevents said compressing unit from compressing the read compressible recorded image data file when the data flag corresponding to the read compressible recorded image data file is not the predetermined status so that the read compressible recorded image data file is not further compressed.

21. The image data compression device according to claim 13, wherein a whole image rises all raster rows and byte groups of an image of each of said plurality of image data files.

22. The image data recording device according to claim 13, wherein said controller controls said compressing unit to compress said recorded image data file, if the read data flag corresponding to said read recorded image data file is said first predetermined status, regardless of whether said recorded image data file was previously compressed.

23. A method of controlling compression, which employ a first method for compressing a non-compressed image data file to a first compressed file and a second method for compressing the first compressed file to a second compressed file, comprising:

selecting the first method if a first flag associated with a file is set;

selecting the second method if the first flag associated with the file is not set;

setting, when each image data file is stored in a recording medium, and in response to a user's instruction, a second flag associated with each image data file, the second flag representing whether each compressible image data file is allowed to be compressed into a compressed image data file having a lower image quality than said image data file before compression;

selecting a compressible image data file to be compressed;

reading the status of the second flag associated with the selected compressible image data file to be compressed;

deciding in accordance with the read status of the second flag, whether the compressible image data file is allowed to be compressed into the compressed image data file having the lower image quality than the image data file before the compression, before initiation of compression of the selected image data file; and compressing the selected compressible image data file with the selected method into the compressed image data file having the lower image quality than the selected compressible image data file before compression if it is determined that compression is allowed.

* * * * *